United States Patent Office 3,429,503
Patented Feb. 25, 1969

3,429,503
CASH REGISTERS AND LIKE ADDING MACHINES
Henry Gross, Braewood, Winnington Road, and Samuel Gross, 22 Winnington Road, both of London N.2, England
Filed Feb. 17, 1967, Ser. No. 616,950
Claims priority, application Great Britain, Mar. 2, 1966, 9,134/66
U.S. Cl. 235—14       3 Claims
Int. Cl. G07g *1/00*

ABSTRACT OF THE DISCLOSURE

A cash register having amount keys and only two motor operating buttons, operation of the first button effecting itemising of an amount set up on the keyboard or sub-totaling of amounts previously itemised and operation of the second effecting totalising of previously entered items or itemising followed automatically by totalising during two continuous cycles of the cash register.

---

This invention relates to cash registers and like adding machines of the kind comprising toothed elements which, during the entry of amounts into the machine, are differentially movable under the control of manually operable amount keys, and a counter having toothed adding wheels actuable by said toothed elements during each operational cycle of the machine, the movements of the toothed elements during total taking being controlled by said toothed wheels. In machines of this kind it is customary to provide means for issuing a ticket on which both the amounts and the total are printed.

A cash register of the above kind is known in which the different operations are determined by the actuation of control plungers, for example a first plunger which conditions the machine to enter and print each item set up on the amount keys and a second plunger which causes the total of the entered items to be printed and then zeroises the counter, the second plunger being actuated after the last item has been entered in the counter. A machine is also known in which, after depressing the amount key or keys corresponding to the last item to be entered, a double cycle is produced by actuating first a button (which may be labelled "TOTAL") and then an electric motor bar, the first cycle effecting the entry of the said item and the second cycle causing the item total to be taken. In each of these known machines it will be apparent that, apart from depression of the amount keys, the operator has to carry out two operations to enter the last item and take the total, and it is an object of the invention to simplify the machine so as to enable both the item entry and the item totalising to be affected by a single manual operation.

According to the invention there is provided a cash register or like adding machine of the class referred to, comprising means by which, upon actuation first of an amount key or keys and then of a totalising plunger, the machine is caused to make two successive operational cycles during the first of which an amount is entered in the counter and during the second of which a total of entered amounts is taken and the counter is zeroised.

The invention may also provide means to enable the operator to take a sub-total of entered amounts at any time without zeroising the counter.

The invention is illustrated by way of example in the accompanying drawings, in which.

Figure 1:
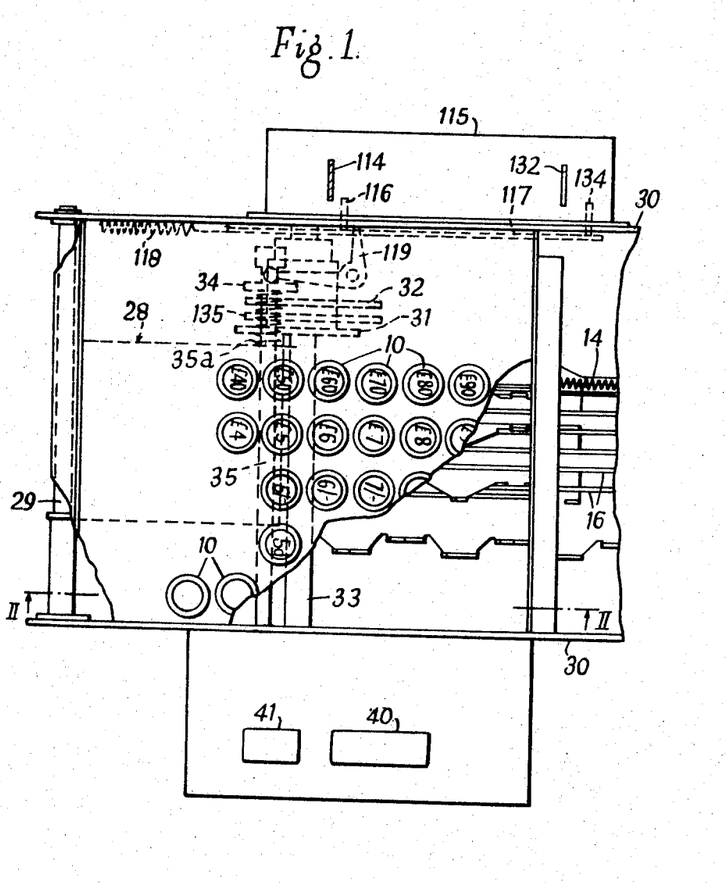
FIGURE 1 is a fragmentary plan view of the machine.
Figure 2:
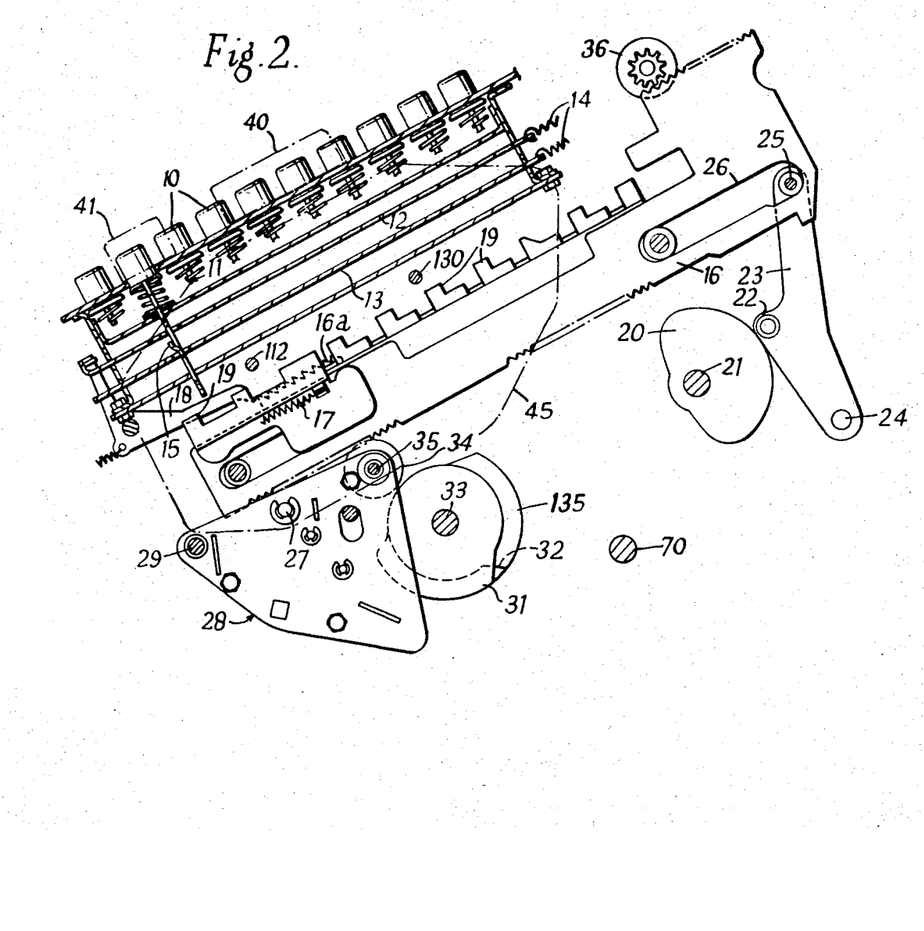
FIGURE 2 is a longitudinal section partly on line II—II of FIGURE 1.

The invention is illustrated as applied to a cash register of the same general class as that shown in our British Patent No. 1,012,831, having banks of press-down amount keys 10 (FIGURES 1 and 2) spring-loaded into the upper rest position and having stems 11 co-operating with groups of upper and lower slide bars 12, 13 respectively. The slide bars are pulled rearwardly by tension springs 14, and when the amount keys are depressed they are held down by the engagement of projections 15 with the lower slide bars 13. The upper slide bars 12 are operative to lock the Keyboard against actuation during cycling of the machine. Beneath the slide bars are racks 16, one for each bank of amount keys, which are pulled forwardly by springs 17 and, in the rest position of the machine, are held in their rearward positions by pawls 18 engaged with teeth 16a on the racks and releasable by the forward movement of the lower slide bars 13. Each rack bar carries projections 19 corresponding to the number of keys in the associated key bank. The racks are actuated by a pair of identical cams 20 (only one of which is shown in FIGURE 2) secured on a shaft 21 and co-operating with follower rollers 22 on a pair of identical levers 23 pivoted at 24, said levers carrying a rod 25 which extends through slots 26 in said racks. The racks are engageable by the toothed adding wheels 27 of a counter 28 rockable on a transverse shaft 29 secured in the side frames 30 of the machine under the action of one or other of two coaxial cams 31, 32 secured on a shaft 33. The cams are selectively engageable with a follower roller 34 mounted on a spindle 35 which is slidable in the counter 28 parallel to the shaft 29, displacement of the follower roller being dependent, as will later be described, upon the particular operation that the machine is conditioned to accomplish. The racks may also be used to control the setting of type wheels 36 for printing the items and item totals.

The operations which the machine is required to accomplish are the storing in the counter 28 of the individual items set up on the amount keyboard, for example, the value of different purchases made by a customer in a store, and the total of such items. These operations are controlled by two plungers 40, 41 (see also FIGURE 3) which may be designated "LIST" and "TOTAL" respectively and are located at the right-hand side of the amount keyboard. The LIST or itemising plunger has a stem 42 formed with elongated slots 43 by which it is guided for depressed and return movements on studs 44 projecting from a mounting bracket or plate 45 secured to the adjacent machine side frame 30. A slave stem 46 (FIGURE 4) movable and generally identical with the stem 42 except that it does not carry a plunger and is formed with a recess 47, is also mounted through the medium of elongated slots 48 on the studs 44, the two stems 42 and 46 being interconnected by a tension spring 49 the action of which pulls the slave stem down with the plunger stem 42. The recess 47 is engageable by a roller 50 on a pin 51 projecting from the upper end of a lever 52 pivoted on the plate 45 at 53 and loaded in the clockwise direction by a spring 54. The lower end of lever 52 abuts a pin 55 on a slide bar 56 guided for longitudinal movement on pins 57 projecting from the plate 45 and engaging in elongated slots 58 in said slide bar. At its rear end the slide bar 56 is formed with a slot 59 engaged by a pin 60 on a pawl 61 pivoted at 62 on plate 45. The pawl is formed with a shoulder 63 which is engageable with an angled end 64 of a lever 65 pivoted on the forward pin 57, movement of said lever about its pivot controlling the operation of a switch for a clutch transmitting the motor drive to the machine, the clutch switch being shown in FIGURES 7 to 9 at 66. Lever 65 is loaded by a spring 67 in the clockwise direction and carries a roller 68 co-operating with a cam 69 secured on a shaft 70. The lower end of the slave stem is engageable in the lower position of said stem with a roller 71 mounted on a lever 72 pivoted at 73 on the plate 45, said lever also carrying a roller 74 running on a cam 75 secured to shaft 70. The slave stem carries a pin 76 engaged in a slot in one arm of a bell-crank lever 77 pivoted on the plate 45, the other arm of said bell-crank lever also being slotted at 78 and co-operating with a pin 79 (FIGURE 7) on the keyboard locking slide bar 13.

The TOTAL plunger 41 is provided with a stem 80 which, similarly to the LIST plunger stem 42, is mounted for depressed and return movement by means of elongated slots 81 on studs 82 projecting from the plate 45. At its lower end the stem 80 is formed with an extension 83 provided with opposed front and rear notches 84, 85 engageable by front and rear locking pawls 86, 87 interconnected by a tension spring 88. The front pawl 86 has connected thereto by a pin-and-slot connection 89 one end of a link 90 the other end of which is also slotted to engage the pin 51 on lever 52. The rear pawl 87 is slotted at 91 to engage a pin 92 on an arm 93a of a total selecting lever 93 pivotally mounted at 94 on the plate 45, said lever 93 carrying a roller 95 running on a stepped cam 96 (FIGURE 7) secured on the shaft 70. The pin 92 projects into a recess formed in the extension 83 of the stem 81 by an upstanding part 97 and in the rest position of the machine is located adjacent said part 97 by the action of a spring 98. A pawl 99 pivoted on the machine side frame 30 at 100 and actuable by a slide bar 12 upon operation of any one of the amount keys 10 has a lower angled end which is adapted to overlie the left-hand end of the lever 93.

The LIST plunger stem 42 is slotted at 42a to co-operate with a toggle lever 105 pivoted on plate 45 at 106. The stem 80 of the TOTAL plunger carries a pin 107 co-operating with a second toggle lever 108 also pivoted on plate 45 at 109, said lever 108 having thereon a roller 110 engageable with the toggle lever 105. The arrangement of said toggle levers is such that, while being in co-operating engagement with one another through the roller 110 in the rest position of the machine as well as with the TOTAL plunger 41 depressed, they are disengaged from one another upon depression of the LIST plunger.

The arm 93a of the total selecting lever 93 co-operates with a pin 111a on an arm 111 secured on one end of a spindle 112 extending across the machine and journalled in the side frames 30, and at its other end said spindle has secured thereto another arm 113 formed with an angled end 113a engaging in a notch in a bar 114 (see also FIGURE 1) mounted for upward and downward movement on a bracket 115 at the left-hand side of the amount keyboard. The bar 114 in its lowered position is engageable by a projection 116 on a slide 117 which is loaded towards the forward end of the machine by a spring 118 and is held in its rearward rest position by a latching pawl (not shown). The slide 117 co-operates with one arm of a bell-crank lever 119 the other arm of which co-operates with the follower roller 34 on the counter 28, said roller in the rest position being, as shown in FIGURE 1, displaced relative to the cams 31 and 32 by a spring 35a.

Figure 3:
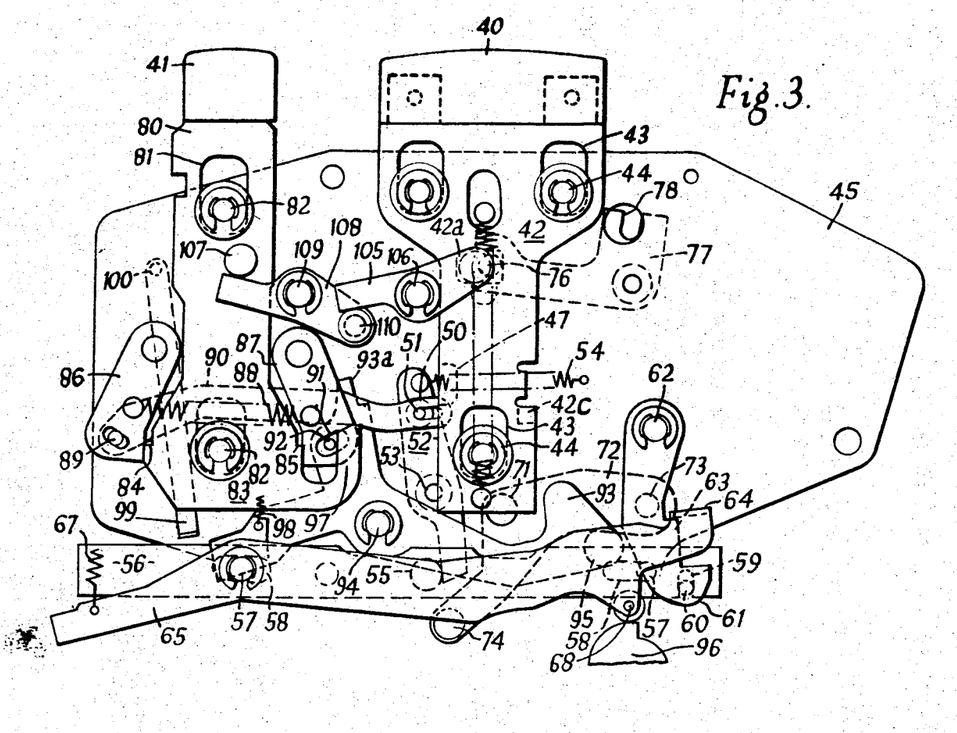
FIGURE 3 is a detail view of the control bracket shown in FIGURES 1 and 2.
Figures 4, 5, 6:
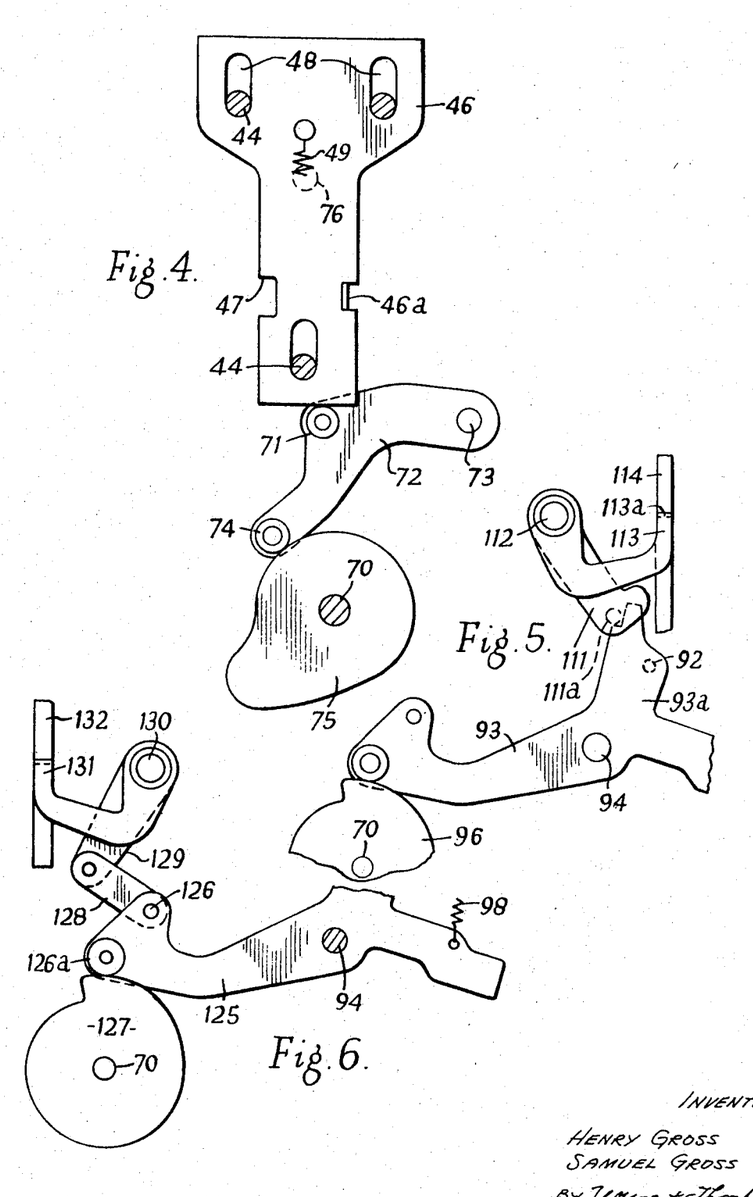
FIGURE 4 is a detail view of the slave stem controlling the operating motor.
FIGURE 5 is a detail view of the total selecting lever and associated mechanism.
FIGURE 6 is a detail view of the sub total selecting lever and associated mechanism.
Figure 7:
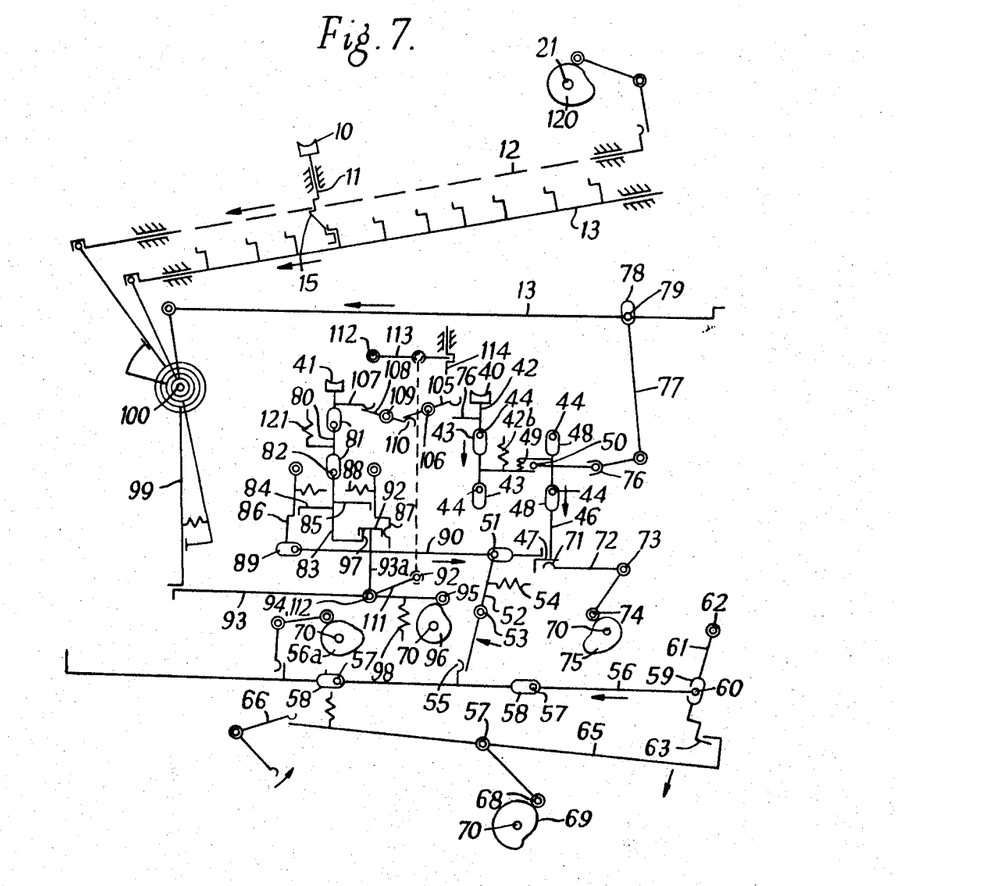
FIGURE 7 is an operational diagram showing the position of the mechanism at the commencement of an item entry.

With the machine in its rest condition, the control mechanism mounted on the plate 45 is positioned as shown in FIGURE 3, the follower roller 95 on the total selected lever 93 engaging a high point on its actuating cam 96 (see FIGURE 7). To enter an item into the counter 20, the appropriate amount keys 10 are first depressed and are latched by the associated upper slide bars 12, the pawl 99 being simultaneously rocked in the counter-clockwise direction to overlie the left-hand end of the total selecting lever 93. At the same time the rack bars 16 are released by their retaining pawls 18. The LIST plunger 40 is then depressed (see FIGURE 4) and the slave stem 46 follows this movement under the tension of spring 49. The roller 50 then enters the notch 47 to latch the slave stem in the lowered position, the plunger stem 42 then being retained in the depressed position by the engagement of a projection 42c on said stem with a superposed projection 46a on the slave stem. The engagement of roller 50 in notch 47 rocks lever 52 in the clockwise direction, thereby moving the slide bar 56 forwardly and rocking pawl 61 in the clockwise direction to disengage its shoulder 63 from the angled part 64 of switch operating lever 65. This engages the clutch to start the machine, during the operation of which the cam shafts 21, 33 and 70 are rotated through one revolution and the racks 16 are moved under the control of cams 20 to their forward positions determined by the stems of the depressed amount keys.

During this operation of the machine the total selecting lever 93, although running off the high point of its actuating cam 96, is retained in its rest position by the pawl 99 and this is disengaged from the cam. The slide 117 is released from its latching pawl and moves forwardly under the action of spring 118 to locate the follower roller 34 opposite the cam 31. This cam is designed to rock the counter upwards about its shaft 29 and so mesh its toothed wheels 27 with the racks 16 as the latter are returned by cams 20 to the rear position. The amount set up on the keyboard is thus entered in the counter, which latter is then returned to its rest position. As the machine completes its cycle the follower roller 95 is re-engaged by its cam 96, the switch operating lever 65 is returned to the rest position by cam 69 to disengage the clutch and the switch slide bar 56 is moved to its rearward position by a cam 56a to re-engage the shoulder in pawl 61 with lever 65. Lever 52 is thus rocked in the counter-clockwise direction to disengage roller 50 from notch 47 and enable the slave stem 46 and plunger stem 42 to return to their upper positions under the action of a spring 42b to release the keyboard. The key-retaining slide bar 12 is actuated by a cam 120 on shaft 21 to release the depressed amount keys and return pawl 99 to the inoperative position.

Figure 8:
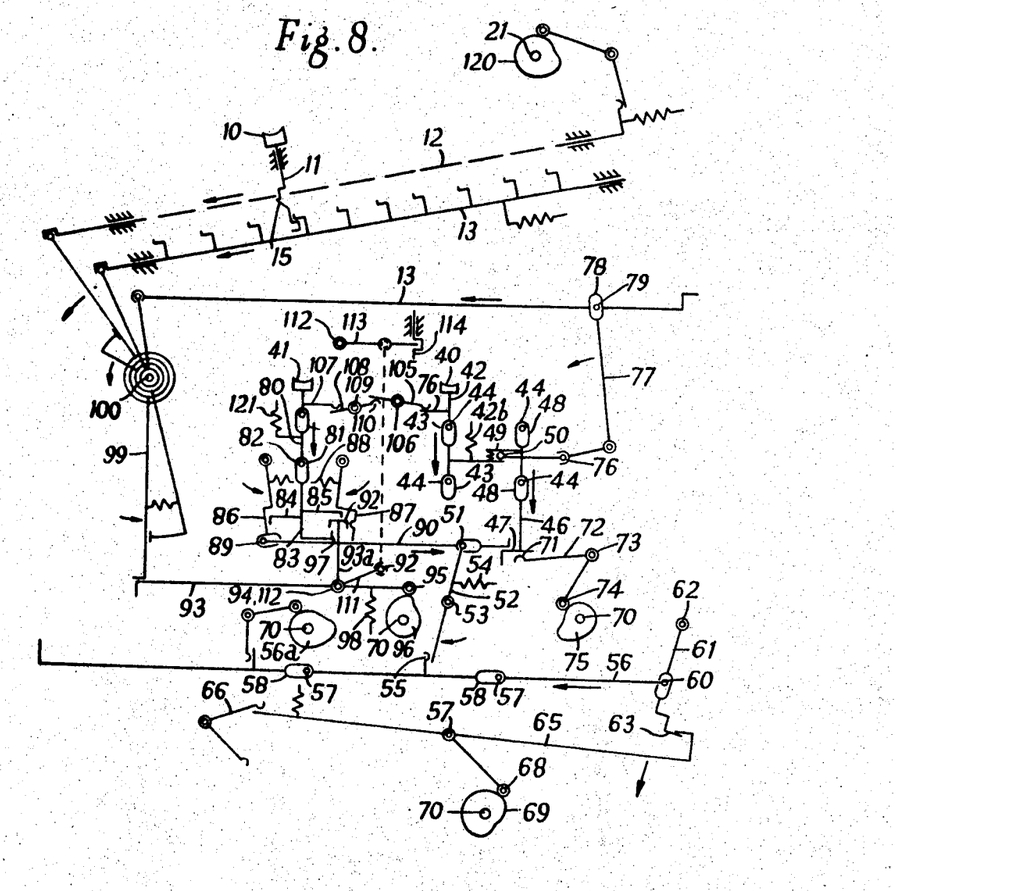
FIGURE 8 is an operational diagram showing the position of the mechanism at the commencement of the double cycle.
Figure 9:
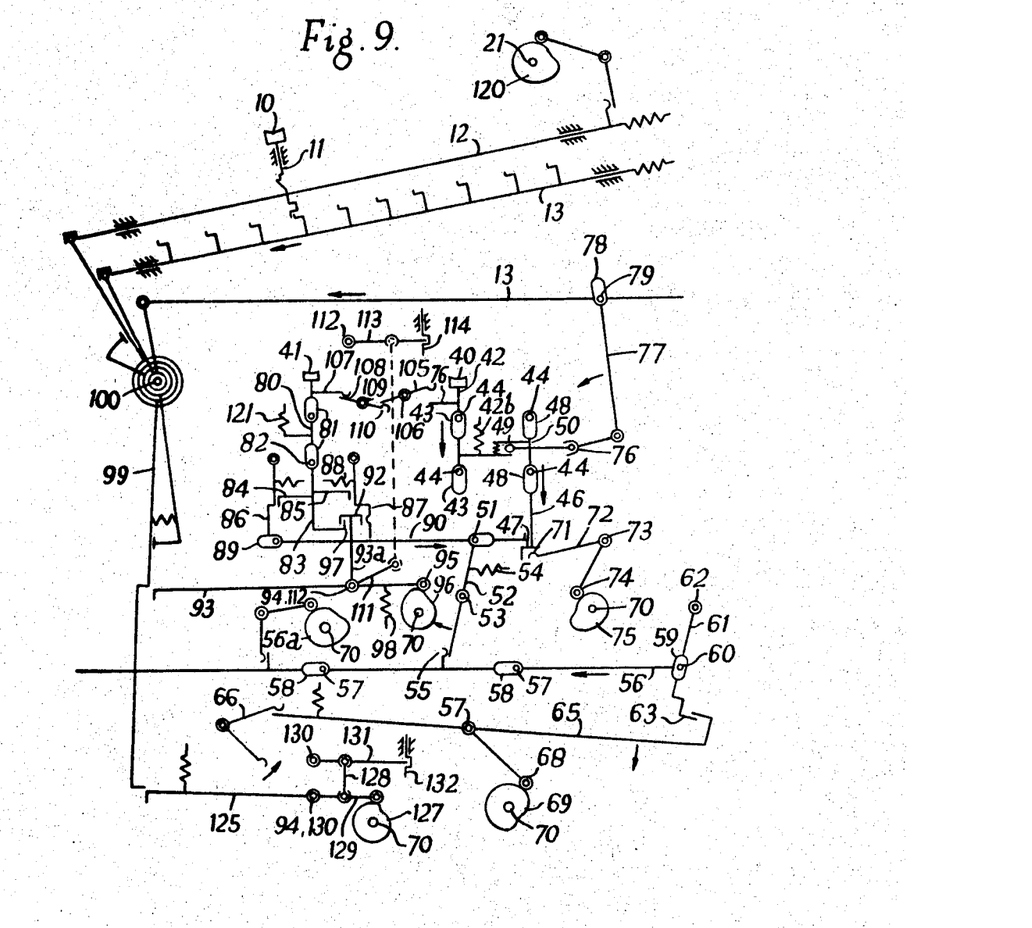
FIGURE 9 is an operational diagram showing the position of the mechanism at the commencement of sub-totalling.

The cycle of operations just described is repeated for all other items to be stored in the counter with the exception that, instead of depressing the LIST plunger 40 after actuating the amount keys corresponding to the last item, the TOTAL plunger 41 is depressed. The effect of this, as will now be described with particular reference to FIGURE 8, is to cause the machine to cycle twice, the first cycle entering the last item into the counter and the second cycle producing the item total.

When, after the amount keys 10 corresponding to the last item have been depressed, followed by depression of the TOTAL plunger, the toggle lever 108 is rocked in the counter-clockwise direction and thus rocks toggle lever 105 in the clockwise direction. The slave stem 46 is thus lowered to start the machine.

Depression of the TOTAL plunger also permits the front and rear pawls 86, 87 to engage the corresponding notches 84, 85 in the stem extension 83 and so lock said plunger, as well as the LIST plunger in the depressed position. In addition, the upstanding part 97 of the extension 83 is disengaged from the pin 92 on the total selecting lever 93. Due to the depression of one or more of the amount keys the first cycle of the machine is initially similar to that described above so that the last item is entered in the counter. However, towards the conclusion of this cycle, the slave stem is returned to its upper position against the action of spring 49 by cam 75, thus releasing the keyboard and actuating the switch operating lever 65 and switch slide bar 56 to disengage the clutch. The consequent movement of link 90 to the left disengages pawl 86 from the notch 84 is extension 83, the TOTAL plunger being then retained in the depressed position by the pawl 87. The cam 120 operates to release the depressed amount keys and then the cam 75 permits the slave stem 46 to return to the lowered position, with consequent re-engagement of the clutch and of pawl 86.

The machine then carries out the second cycle, and since pawl 99 is now in its inoperative position the total selecting lever follower roller 95 remains in engagement with its cam 96 and said lever rocks in the clockwise direction, disengaging the rear pawl 87 from the notch 85. The arm 97 of lever 93 thus rocks arm 111, spindle 112 and arm 113 to lower bar 114 into the path of the projection 116 on slide 117. When said slide is released from its latching pawl it is therefore moved forward through only a fraction of its full movement in order to locate the counter follower roller 34 opposite the cam 32. This cam is designed to rock the counter to engage its toothed wheels 27 with the racks 16 as the latter are again moved forwardly and to disengage said wheels from the racks as the latter make their return movement. The counter is consequently zeroised during the total taking cycle. The front locking pawl 86 remains operative to hold the TOTAL and LIST plungers until the selector lever 93, towards the end of said cycle, is restored by its cam 96 to its initial position, the rearward return movement of switch slide bar 56 moving pawl link 90 to the left and thus disengaging front pawl 86 from notch 84. The TOTAL plunger is then returned by a spring 121 to the rest position and the toggle levers 105, 108 are thus released to permit return movement of the slave stem 46.

From the foregoing it will be understood that the last one of, for example, a number of items purchased in a store is entered in the counter and the total of such purchases is then taken solely by the depression of the TOTAL plunger. It will also be understood that, for the purchase of a single item, depression of the TOTAL plunger will first enter said item in the counter and then take the total, and a ticket issued by the machine will show the value of the purchase and also the same amount for the total. Nevertheless, should the operator, either intentionally or otherwise, actuate the LIST plunger for a single item or for the last of a number of items, the machine will cycle once to enter the said item and depression of the TOTAL plunger will then be necessary to produce the totalling and zeroising cycle.

The invention also provides means to enable the operator, at any time during the entry of items into the counter, to ascertain the total of entered items without zeroising the counter. For this purpose a sub-total selecting lever 125 (FIGURE 6) is mounted on the same pivot 94 as the total selecting lever 93. The lever 125 is identical with the lever 93 except that it carries a pin 126 instead of a pin 92. In addition the lever 125 is co-operable during the taking of a sub-total with a cam 127 identical with cam 96 and also secured to the camshaft 70.

The sub-totalling operation is effected, with the amount keys 10 in the raised position, by depression of the LIST plunger 42, and with it the slave stem 46. The keyboard locking slide 13 is moved to the operative position while the pawl 99 remains in the inoperative position. This pawl is here formed so as to be capable, during item entry, of arresting the operation of both of the selecting levers 93 and 125. The selecting lever 125 is connected by a link 128 (FIGURE 6) to an arm 129 fixed on one end of a spindle 130 journalled in the machine side frames 30, the other end of said spindle having an arm 131 secured thereon which has a bent end engaging in a notch in an upwardly and downwardly movable bar 132. The bar in its lowered position is engageable by a projection 133 on the slide 117 (FIGURE 1) so as to allow said slide, when it is released, to move forward to a position, in advance of that determined by the projection 116, opposite a cam 135. This cam is designed to engage the toothed counter wheels 34 with the racks 16 during both the forward and return movements of the racks. The forward travel of the racks accordingly sets the type wheels 36 to print the total of the entered amounts and the rearward travel reinstates this total in the toothed counter wheels, the machine then being in condition for the entry of any additional items.

As is customary in machines of the class referred to and as shown in our aforesaid British Patent No. 1,012,831, a second counter will be provided which is co-operable with the racks 16 to take an accumulated total such, for example, as the total of one day's cash trade; and other additional counters may be similarly provided such as assistants' and dissecting counters.

We claim:

1. A cash register comprising a counter, amount keys, an itemising plunger, a totalising plunger, first means operative in response to the actuation of amount keys followed by actuation of the itemising plunger to enter an amount set up on the amount keys into said counter, second means operative in response to actuation of said itemising plunger in the absence of actuated amount keys to take a sub-total of said entered amounts without zeroizing, third means operative in response to actuation of said totalising plunger in the absence of actuated amount keys to take an end total of said entered amount and zeroize said counter and fourth means operative in response to actuation of amount keys followed by actuation of said totalising plunger to enter an amount set up on the amount keys into said counter, take an end total of the amounts entered into said counter and zeroize said counter in one continuous operation.

2. In a cash register comprising a main operating shaft, a motor for rotating the shaft, a counter, amount keys, an itemising plunger, a totalising plunger, first means responsive to the actuation of amount keys followed by actuation of said itemising plunger to switch on the motor and drive the shaft through one revolution so as to cycle the machine once, second means operative during said cycle to enter an amount set up on the amount keys into said counter, a first selecting member movable to condition the machine to take a total of entered amounts and zeroize the counter, and a second selecting member movable to condition the machine to take a sub-total of entered amounts without zeroizing the counter, the provision of a blocking member movable upon actuation of any amount key to a locking position to prevent said selecting members from moving a portion of the totalising plunger to prevent the first selecting member from moving unless the totalising plunger is depressed, and third means operative in response to actuation of amount keys followed by actuation of said totalising plunger to cycle the machine twice continuously and operate said second means during the first cycle and at the end of the first cycle allow said blocking member to return to its initial position so that the first selecting member can operate during the second cycle.

3. A cash register as claimed in claim 1, in which said totalising plunger has notches thereon and in which the third means comprises a pair of locking pawls which enter said notches in the totalising plunger when it is depressed to retain said plunger in a depressed position, a pair of toggle levers to couple the plungers together and arranged so that when the totalising plunger is depressed the itemising plunger is automatically depressed, a slave stem resiliently coupled to and actuable by the itemising plunger, said slave stem being coupled to keyboard release means and having a recess thereon, and motor operating means having a projection, whereby when amount keys are depressed the blocking member pivots to its blocking position and when the totalising plunger is then depressed the itemising plunger is automatically depressed and moves its slave stem so that the projection on the motor operating lever enters the recess in the slave stem so that the motor operaing means pivots to switch on the motor, the locking pawls enter said notches and the machine cycles once at the end of which cycle the projection is moved out of said recess and the slave stem moved relative to the itemising plunger to release the amount keys and thus pivot the blocking member away from the selecting members, the slave stem then being returned to its depressed position to cause the motor to be switched on to cycle the machine again, the first selecting member then pivoting to condition the machine to disengage one of said locking pawls away from said totalising plunger, the other locking pawl being disengaged from said totalising plunger upon restoration of said first selecting member at the end of the second cycle.

References Cited

UNITED STATES PATENTS

| | | | |
|---|---|---|---|
| 1,109,697 | 9/1914 | Muzzy | 235—3 |
| 2,221,686 | 11/1940 | Wicks | 235—62 |
| 2,344,410 | 3/1944 | Rauh | 235—62 |
| 2,514,754 | 7/1950 | Gang | 235—62 |
| 3,042,300 | 7/1962 | Anderson | 235—62 |
| 3,104,807 | 9/1963 | Plaut | 235—62 |

RICHARD B. WILKINSON, *Primary Examiner.*

S. A. WAL, *Assistant Examiner.*

U.S. Cl. X.R.

235—62.